US012662202B2

(12) United States Patent
Ito et al.

(10) Patent No.: US 12,662,202 B2
(45) Date of Patent: Jun. 23, 2026

(54) VEHICLE BODY STRUCTURE OF CAB-OVER TYPE VEHICLE

(71) Applicant: MITSUBISHI JIDOSHA KOGYO KABUSHIKI KAISHA, Tokyo (JP)

(72) Inventors: Motoshi Ito, Aichi (JP); Yorito Takemoto, Tokyo (JP); Isahiro Imamura, Tokyo (JP); Shoji Masuda, Tokyo (JP); Hiroki Yamanishi, Aichi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 18/284,154

(22) PCT Filed: Mar. 8, 2022

(86) PCT No.: PCT/JP2022/009873
§ 371 (c)(1),
(2) Date: Sep. 26, 2023

(87) PCT Pub. No.: WO2022/209616
PCT Pub. Date: Oct. 6, 2022

(65) Prior Publication Data
US 2024/0166273 A1 May 23, 2024

(30) Foreign Application Priority Data
Mar. 30, 2021 (JP) ................................. 2021-056634

(51) Int. Cl.
*B62D 33/06* (2006.01)
*B60N 2/015* (2006.01)
*B60R 22/22* (2006.01)

(52) U.S. Cl.
CPC ............. *B62D 33/06* (2013.01); *B60N 2/015* (2013.01); *B60R 22/22* (2013.01)

(58) Field of Classification Search
CPC .... B62D 25/20; B62D 33/06; B62D 33/0604; B60R 22/22; B60N 2/015
See application file for complete search history.

(56) References Cited

U.S. PATENT DOCUMENTS

2024/0239244 A1* 7/2024 Nakayama ........... B60K 15/067

FOREIGN PATENT DOCUMENTS

| JP | 4-96588 U | 8/1992 | |
| JP | 11105746 A * | 4/1999 | ............. B62D 43/10 |

(Continued)

OTHER PUBLICATIONS

International Search Report (PCT/ISA/210) issued in PCT/JP2022/009873, dated Apr. 12, 2022.

(Continued)

*Primary Examiner* — Daniel J Colilla
(74) *Attorney, Agent, or Firm* — Birch, Stewart, Kolasch & Birch, LLP

(57) ABSTRACT

A vehicle body structure of a cab-over type vehicle includes: a floor cross member extending in a vehicle width direction along a lower surface of a floor panel of a cab body and including a pair of mount portions to which mounts are attached on both sides in the vehicle width direction; and a gusset extending in a vehicle front-rear direction between the pair of mount portions below the floor panel, including one end portion joined to the lower surface of the floor panel and the other end portion joined to a lower surface of the floor cross member, and linearly connecting the lower surface of the floor panel and the lower surface of the floor cross member.

7 Claims, 7 Drawing Sheets

(56)            References Cited

FOREIGN PATENT DOCUMENTS

| JP | 2001-213359 A | 8/2001 | |
| JP | 2015-116961 A | 6/2015 | |
| KR | 1998003111 U * | 9/1998 | ............ B62D 21/02 |

OTHER PUBLICATIONS

Japanese Office Action for Japanese Application No. 2023-510744, dated Jan. 23, 2024, with English translation.

* cited by examiner

VEHICLE BODY STRUCTURE OF CAB-OVER TYPE VEHICLE

TECHNICAL FIELD

The present invention relates to a vehicle body structure of a cab-over type vehicle.

BACKGROUND ART

As a structure of a vehicle such as an automobile, there is a cab-over type vehicle in which a cab body constituting a cabin (a vehicle compartment) is supported by a chassis frame via a mount.

Patent Literature 1 discloses a cab-over type vehicle in which a cab body includes a floor panel partitioning a lower portion of a cabin, a floor cross member extending in a vehicle width direction and joined to a lower surface of the floor panel, and a pair of mount portions provided at both ends of the floor cross member in the vehicle width direction and to which mounts are attached.

CITATION LIST

Patent Literature

Patent Literature 1: JP2015-116961A

SUMMARY OF INVENTION

Technical Problem

In such a cab-over type vehicle, when a load due to vibration during traveling is input to the floor cross member via the mounts, torsion occurs in the floor cross member, and thus vibration of the floor panel is likely to occur. Therefore, there is room for improvement in preventing swing and noise in the cabin and improving steering stability.

The present invention has been made in view of the above circumstances, and an object of the present invention is to provide a vehicle body structure of a cab-over type vehicle which is advantageous in preventing swing and noise in a cabin and improving steering stability.

Solution to Problem

To achieve the above object, an embodiment according to the present invention provides a vehicle body structure of a cab-over type vehicle in which a cab body is supported by a chassis frame via mounts. The vehicle body structure of a cab-over type vehicle includes: a floor cross member extending in a vehicle width direction along a lower surface of a floor panel of the cab body and including a pair of mount portions to which the mounts are attached on both sides in the vehicle width direction; and a gusset extending in a vehicle front-rear direction between the pair of mount portions below the floor panel, including one end portion joined to the lower surface of the floor panel and the other end portion joined to a lower surface of the floor cross member, and linearly connecting the lower surface of the floor panel and the lower surface of the floor cross member.

Advantageous Effects of Invention

According to an embodiment of the present invention, a strength and rigidity of a floor cross member can be further improved by a gusset, and even when a load due to vibration during traveling is input to mount portions on both sides of the floor cross member, torsional deformation of the floor cross member can be prevented.

Therefore, vibration and noise in a cabin can be prevented, and rigidity of a cab body (floor panel) is improved by the gusset, which is advantageous in improving steering stability.

DESCRIPTION OF EMBODIMENTS

Figure 1:
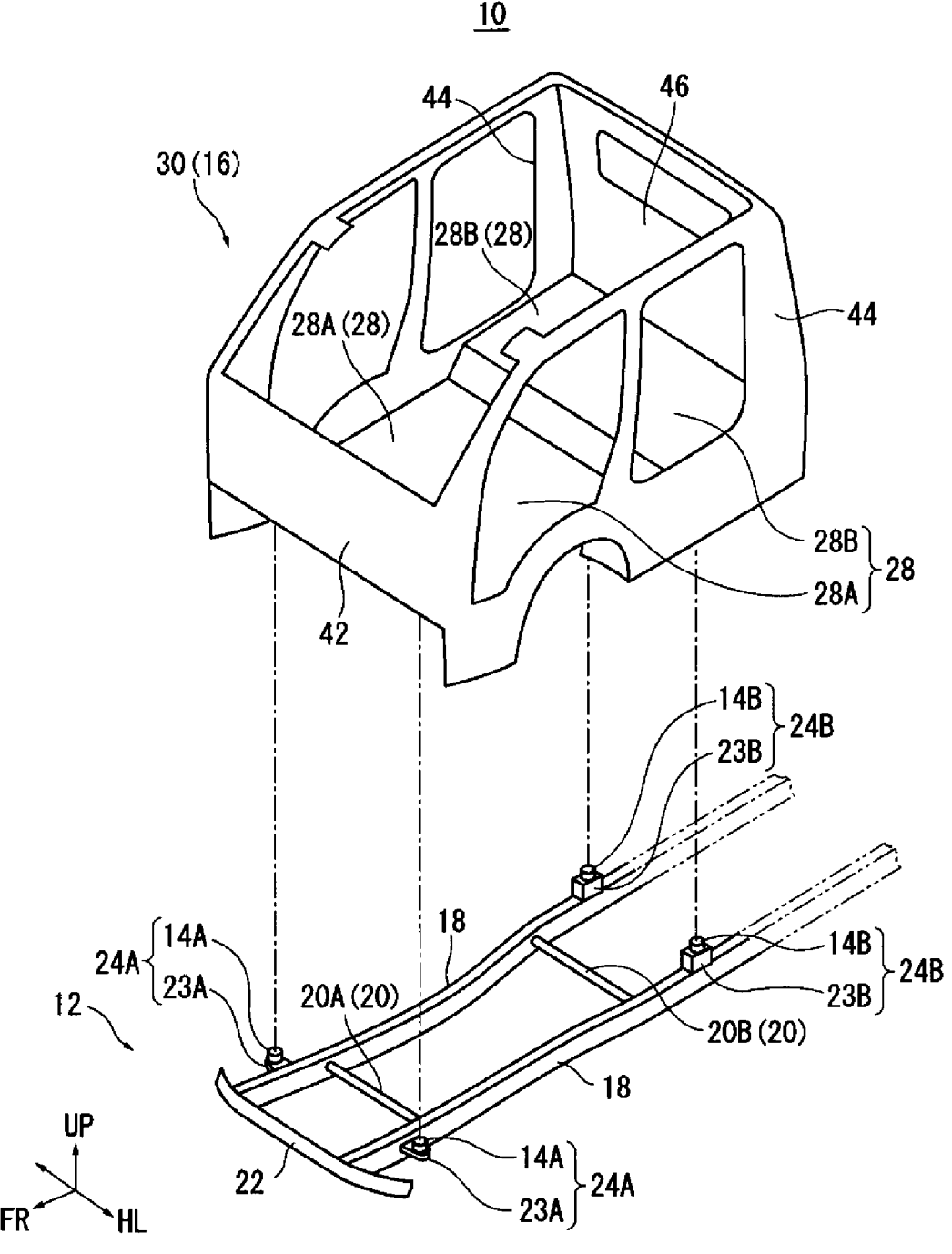
FIG. 1 is an exploded perspective view showing a front portion of a vehicle to which a vehicle body structure of a cab-over type vehicle according to an embodiment is applied.

Hereinafter, a vehicle body structure of a cabin portion of a cab-over type vehicle according to an embodiment of the present invention will be described with reference to the drawings.

In the following drawings, a reference numeral FR denotes a vehicle front side, a reference numeral UP denotes a vehicle upper side, and a reference numeral HL denotes a vehicle width direction.

First, a configuration of a vehicle to which the present invention is applied will be described.

As shown in FIG. 1, a vehicle 10 to which the present invention is applied is a cab-over type vehicle, and is a truck including a chassis frame 12, a cab body 16 supported by the chassis frame 12 via front mounts 14A and rear mounts 14B, and a loading platform (not shown).

The chassis frame 12 supports the cab body 16 and the loading platform from below, and includes a pair of chassis side members 18, a plurality of chassis cross members 20, and a chassis bumper beam 22.

In FIG. 1, a portion of the chassis frame 12 that is located on a vehicle rear side is not shown.

The pair of chassis side members 18 extend in a vehicle front-rear direction at an interval in the vehicle width direction.

The plurality of chassis cross members 20 extend in the vehicle width direction at an interval in the vehicle front-rear direction, and both ends thereof are joined to the pair of chassis side members 18.

In the present embodiment, the chassis cross members 20 includes a front side chassis cross member 20A disposed between the chassis side members 18 on the vehicle front side, and a rear side chassis cross member 20B disposed between the chassis side members 18 below a vehicle rear side portion of a cabin.

The chassis bumper beam 22 extends in the vehicle width direction and joins front ends of the pair of chassis side members 18.

A pair of front mount portions 24A are provided at positions of the pair of chassis side members 18 on the vehicle front side.

The pair of front mount portions 24A includes chassis side front brackets 23A disposed on the chassis side members 18, and a pair of front mounts 14A disposed on the chassis side front brackets 23A and formed of an elastic member such as rubber.

A pair of rear mount portions 24B is provided at positions of the pair of chassis side members 18 corresponding to the cabin on the vehicle rear side.

The pair of rear mount portions 24B includes chassis side rear brackets 23B disposed on upper surfaces of the chassis side members 18, and a pair of rear mounts 14B disposed on the chassis side rear brackets 23B and formed of an elastic member such as rubber.

The cab body 16 includes a cabin frame (not shown) and a cabin main body 30 including a floor panel 28 that partitions a lower portion of the cabin.

The cabin frame is provided on a lower surface of the floor panel 28, may be molded integrally with the floor panel 28, or may be molded separately and attached to the floor panel 28.

The cabin frame includes a pair of floor side members (not shown) and a plurality of floor cross members.

The pair of floor side members extends in the vehicle front-rear direction at an interval in the vehicle width direction on an inner side in the vehicle width direction relative to the chassis side members 18, and has a length from the vicinity of a front end of the cab body 16 to a central portion of the cab body 16 in the vehicle front-rear direction.

The plurality of floor cross members extend in the vehicle width direction at an interval in the vehicle front-rear direction.

The plurality of floor cross members include a rear floor cross member 36 (see FIG. 2) that is provided at the floor panel 28 at a position that is separated rearward from rear ends of the floor side members, and at least one floor cross member (not shown) including both ends joined to the pair of floor side members at a front side relative to the rear floor cross member 36.

Figure 2:
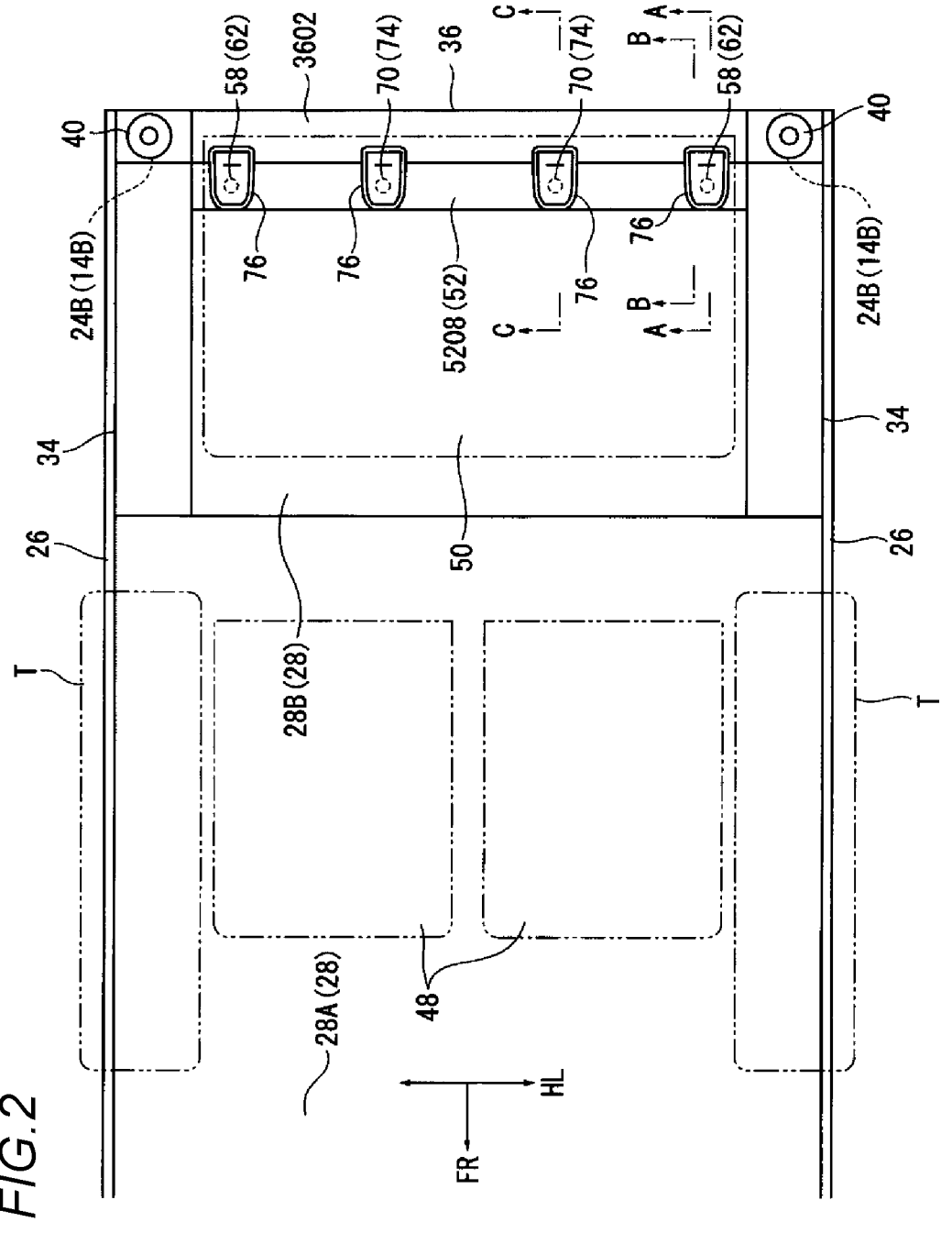
FIG. 2 is a bottom view of the front portion of the vehicle to which the vehicle body structure of the cab-over type vehicle according to the embodiment is applied, as viewed from below.

As shown in FIG. 2, a pair of floor side rear brackets 40 that are attached to the rear mount portions 24B (the rear mounts 14B) are provided at both end lower portions of the rear floor cross member 36.

In the present embodiment, the rear floor cross member 36 extends in the vehicle width direction along a lower surface of the floor panel of the cab body, and corresponds to a floor cross member including mount portions to which mounts are attached on both sides in the vehicle width direction.

In FIG. 2, a reference numeral 26 denotes side sills extending in the vehicle front-rear direction at an interval in the vehicle width direction, and both ends of the floor panel 28 in the vehicle width direction and both ends of the rear floor cross member 36 in the vehicle width direction are joined to the side sills 26.

The cabin main body 30 includes the floor panel 28 that partitions the lower portion of the cabin, a front panel 42 that stands upright from a front portion of the floor panel 28, a pair of side panels 44 that stand upright from both sides of the floor panel 28 in the vehicle width direction, a back panel 46 that stands upright from a rear portion of the floor panel 28, and a roof panel (not shown) that connects upper ends of the panels.

In the present embodiment, the lower surface of the floor panel 28 is joined by welding to the pair of floor side members and the plurality of cross members including the rear floor cross member 36.

As shown in FIG. 2, in the present embodiment, front seats 48 and a rear seat 50 disposed behind the front seats 48 are disposed in the cabin.

The front seats 48 include a driver seat and a passenger seat.

The rear seat 50 is a bench seat on which three occupants can sit, and is disposed above the rear floor cross member 36.

In FIG. 2, a reference numeral T denotes a front wheel.

As shown in FIG. 1, the floor panel 28 includes a front floor panel 28A and a rear floor panel 28B that is connected to a rear portion of the front floor panel 28A and is displaced further upward than the front floor panel 28A.

The front seats 48 are disposed above the front floor panel 28A, and the rear seat 50 is disposed above the rear floor panel 28B.

Positions on both sides of a front portion of the front floor panel 28A are attached to the pair of front mount portions 24A (the front mounts 14A) via a pair of floor side front brackets (not shown). Therefore, the positions on the both sides of the front portion of the front floor panel 28A are supported by the chassis frame 12 via the pair of front mount portions 24A (the front mounts 14A).

Figure 3:
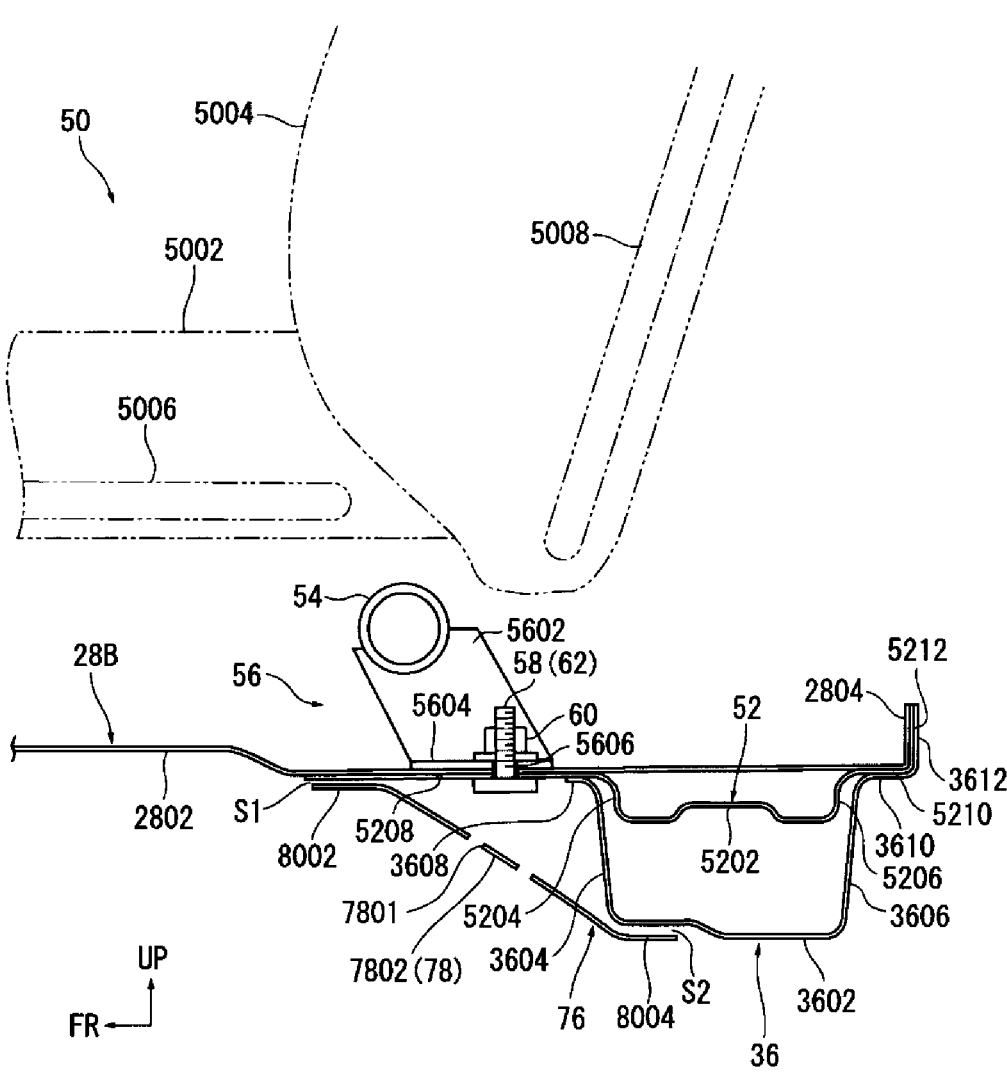
FIG. 3 is a cross-sectional view taken along a line A-A of FIG. 2.

As shown in FIGS. 2 and 3, the rear floor cross member 36 is joined to a lower surface of a rear end of the rear floor panel 28B via a reinforcement 52.

Specifically, the reinforcement 52 is provided between the rear floor cross member 36 and the rear floor panel 28B, and extends in the vehicle front-rear direction while overlapping the rear floor panel 28B from the rear floor cross member 36.

As shown in FIG. 3, the reinforcement 52 has a hat-shaped cross-section open upward.

The reinforcement 52 includes a reinforcement lower surface portion 5202, a reinforcement front surface portion 5204, a reinforcement rear surface portion 5206, a reinforcement front flange portion 5208, a reinforcement rear flange portion 5210, and a reinforcement rear standing portion 5212.

The reinforcement lower surface portion 5202 is located at a lowest level among the portions constituting the reinforcement 52.

The reinforcement front surface portion 5204 stands from a vehicle front end of the reinforcement lower surface portion 5202, and the reinforcement rear surface portion 5206 stands from a vehicle rear end of the reinforcement lower surface portion 5202.

The reinforcement front flange portion 5208 extends toward the vehicle front side from an upper end of the reinforcement front surface portion 5204, and overlaps a lower surface 2802 of the rear floor panel 28B.

In other words, the reinforcement 52 extends toward the vehicle front side from the rear floor cross member 36 while overlapping the rear floor panel 28B.

The reinforcement front flange portion 5208 is formed such that a width of the reinforcement front flange portion 5208 along the vehicle front-rear direction is larger than a width of the reinforcement lower surface portion 5202 along the vehicle front-rear direction.

The reinforcement rear flange portion 5210 extends toward the vehicle rear side from an upper end of the reinforcement rear surface portion 5206 and overlaps the lower surface 2802 of the rear floor panel 28B.

The reinforcement rear standing portion 5212 stands upward from a rear end of the reinforcement rear flange portion 5210, and overlaps a standing portion 2804 at a rear end of the rear floor panel 28B from the vehicle rear side.

As shown in FIG. 3, the rear floor cross member 36 has a hat-shaped cross-section open upward.

The rear floor cross member 36 includes a cross member lower surface portion 3602, a cross member front surface portion 3604, a cross member rear surface portion 3606, a cross member front flange portion 3608, a cross member rear flange portion 3610, and a cross member rear standing portion 3612.

The cross member lower surface portion 3602 is located at a position spaced apart from the reinforcement lower surface portion 5202 below the reinforcement lower surface portion 5202.

The cross member front surface portion 3604 stands upright from a vehicle front end of the cross member lower surface portion 3602, and is located at a position away from a vehicle front side of the reinforcement front surface portion 5204.

The cross member rear surface portion 3606 stands upright from a vehicle rear end of the cross member lower surface portion 3602, and is located at a position away from a vehicle rear side of the reinforcement rear surface portion 5206.

The cross member front flange portion 3608 extends forward from an upper end of the cross member front surface portion 3604 and overlaps a lower surface of the reinforcement front flange portion 5208.

The cross member front flange portion 3608 is formed such that a width of the cross member front flange portion 3608 along the vehicle front-rear direction is smaller than a width of the reinforcement front flange portion 5208 along the vehicle front-rear direction. The cross member rear flange portion 3610 extends rearward from an upper end of the cross member rear surface portion 3606 and overlaps a lower surface of the reinforcement rear flange portion 5210.

The cross member rear standing portion 3612 stands upward from a rear end of the cross member rear flange portion 3610 and overlaps the reinforcement rear standing portion 5212 from the vehicle rear side.

The reinforcement front flange portion 5208 and the cross member front flange portion 3608 overlap the lower surface 2802 of the rear floor panel 28B and are joined by welding in a three-layer manner, and the reinforcement rear flange portion 5210 and the cross member rear flange portion 3610 overlap the lower surface 2802 of the rear floor panel 28B and are joined by welding in a three-layer manner.

As shown in FIGS. 1 and 2, both ends of the cross member lower surface portion 3602 in the vehicle width direction are attached to the pair of rear mount portions 24B (the rear mounts 14B) via the pair of floor side rear brackets 40. Therefore, the both ends of the rear floor cross member 36 are supported by the chassis frame 12 via the pair of rear mount portions 24B (the rear mounts 14B).

Therefore, the cab body 16 is supported by the chassis frame 12 via the front mounts 14A and the rear mounts 14B.

Next, an attachment structure of the rear seat 50 will be described.

As shown in FIG. 3, the rear seat 50 includes a seat cushion 5002 on which the occupant sits, and a seat back

5004 standing from a rear portion of the seat cushion 5002 and serving as a backrest for the occupant.

The seat cushion 5002 includes a seat cushion frame 5006 constituting a frame of the seat. The seat back 5004 includes a seat back frame 5008 constituting a frame of the seat.

The seat cushion frame 5006 and the seat back frame 5008 are connected to a shaft 54 extending in the vehicle width direction at a position below a rear portion of the seat cushion 5002.

Both ends of the shaft 54 in an extending direction are attached to the rear floor panel 28B via a pair of seat attachment members 56.

As shown in FIG. 3, each of the seat attachment members 56 includes a connecting plate 5602 that is welded to an outer periphery of the shaft 54 and extends downward, and an attachment piece 5604 that protrudes outward in the vehicle width direction from a lower end of the connecting plate 5602.

The attachment piece 5604 has a bolt insertion hole 5606.

A stud bolt 58 that passes through the rear floor panel 28B and protrudes upward is provided at a position of the reinforcement front flange portion 5208 corresponding to the bolt insertion hole 5606 of the attachment piece 5604.

The stud bolt 58 is inserted through the bolt insertion hole 5606 of the attachment piece 5604, a nut 60 is fastened to the stud bolt 58, and the seat attachment member 56 is attached to the rear floor panel 28B. Therefore, the rear seat 50 is attached to the rear floor panel 28B via the shaft 54 and the seat attachment members 56.

Therefore, in the present embodiment, the stud bolt 58 forms a seat attachment portion 62 that is provided at a position of the floor panel 28 and that is used for attaching a seat frame (the seat cushion frame 5006 and the seat back frame 5008) forming the rear seat 50. The seat attachment portion 62 is provided at a position at which the reinforcement 52 and the rear floor panel 28B overlap each other on the vehicle front side of the rear floor cross member 36 and on the vehicle rear side relative to a position of the reinforcement 52 on the vehicle front side.

In other words, the seat attachment portion 62 is provided at the position at which the reinforcement 52 and the rear floor panel 28B overlap each other, at one end portion side of the reinforcement 52 relative to the rear floor cross member 36 and at a rear floor cross member 36 side relative to one end portion of the reinforcement 52 in the vehicle front-rear direction.

Further, in a plan view, the seat attachment portion 62 (the stud bolt 58) is provided at a position of the floor panel 28 that is located inside a contour of a gusset 76 to be described later.

Figure 5:
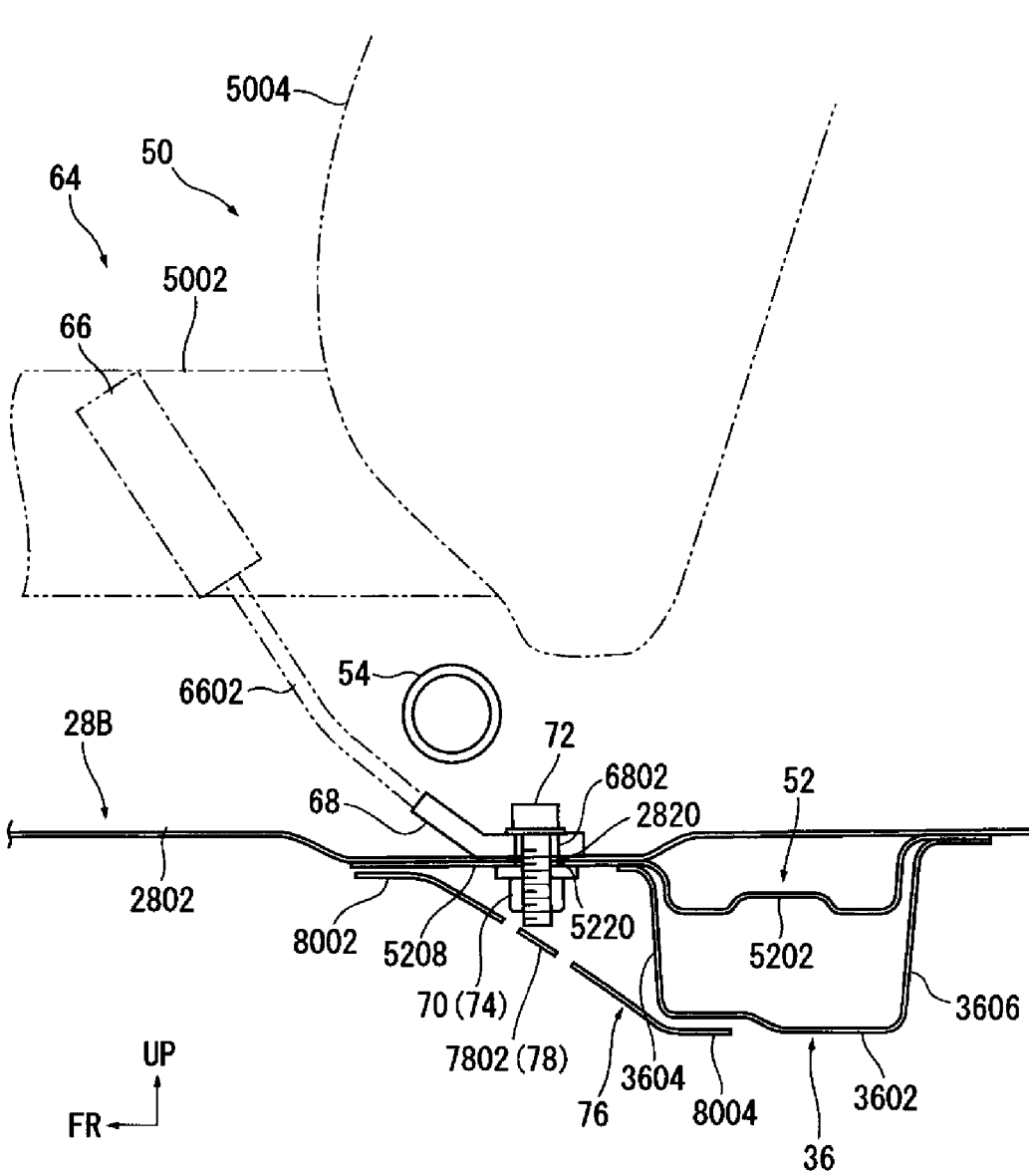
FIG. 5 is a cross-sectional view taken along a line C-C of FIG. 2.

As shown in FIG. 5, the rear seat 50 is provided with three three-point seat belt devices 64 corresponding to the three occupants.

The seat belt device 64 includes a seat belt (not shown), a seat belt anchor (not shown), a retractor (not shown), a tongue (not shown), a buckle 66, and a buckle anchor 68.

The seat belt restrains the occupant seated on the rear seat 50 at a time of a collision, and one end of the seat belt is attached to a cab body 16 side via the seat belt anchor.

The retractor accommodates the other end of the sheet belt to be able to wind and unwind.

The tongue is provided at an intermediate portion of the seat belt.

The tongue is inserted into and removed from the buckle 66, and the buckle 66 is detachably connected to the tongue. The buckle 66 is attached to a cab body 16 side via the buckle anchor 68.

The buckle 66 is disposed toward a front side relative to the gusset 76 to be described later in the vehicle front-rear direction.

In the present embodiment, the seat belt anchors (not shown) of the seat belt devices 64 of left and right seats included in the rear seat 50 are attached to the rear floor panel 28B. As shown in FIG. 5, the buckle anchor 68 is attached to the rear floor panel 28B.

Further, the seat belt anchor (not shown) of the seat belt device 64 of a center seat included in the rear seat 50 is attached to a position of the rear floor panel 28B. As shown in FIG. 5, the buckle anchor 68 is attached to the rear floor panel 28B.

As shown in FIG. 5, the buckle 66 is connected to the buckle anchor 68 via a connecting member 6602, and a first bolt insertion hole 6802 is provided in the buckle anchor 68.

Second and third bolt insertion holes 2820 and 5220 are respectively formed at positions of the rear floor panel 28B and the reinforcement front flange portion 5208 corresponding to the first bolt insertion hole 6802 of the buckle anchor 68. A plate nut 70 is provided coaxially with the second and third bolt insertion holes 2820 and 5220 at the lower surface of the reinforcement front flange portion 5208.

A bolt 72 is inserted through the first bolt insertion hole 6802 of the buckle anchor 68, the second bolt insertion hole 2820 of the rear floor panel 28B, and the third bolt insertion hole 5220 of the reinforcement front flange portion 5208. The buckle anchor 68 is attached to the rear floor panel 28B by the bolt 72 being fastened to the plate nut 70.

Therefore, in the present embodiment, the plate nut 70 forms an anchor attachment portion 74 for attaching the buckle anchor 68. Then, the anchor attachment portion 74 is provided at a position at which the reinforcement 52 and the rear floor panel 28B overlap each other on the vehicle front side of the rear floor cross member 36 and on the vehicle rear side relative to the position of the reinforcement 52 on the vehicle front side.

In other words, the anchor attachment portion 74 is provided at the position at which the reinforcement 52 and the rear floor panel 28B overlap each other on the one end portion side of the reinforcement 52 relative to the rear floor cross member 36 and on the rear floor cross member 36 side relative to the one end portion of the reinforcement 52 in the vehicle front-rear direction.

Further, in the plan view, the anchor attachment portion 74 (the plate nut 70) is provided at a position of the floor panel 28 which is located inside the contour of the gusset 76 (see FIG. 2) to be described later.

Figure 6:
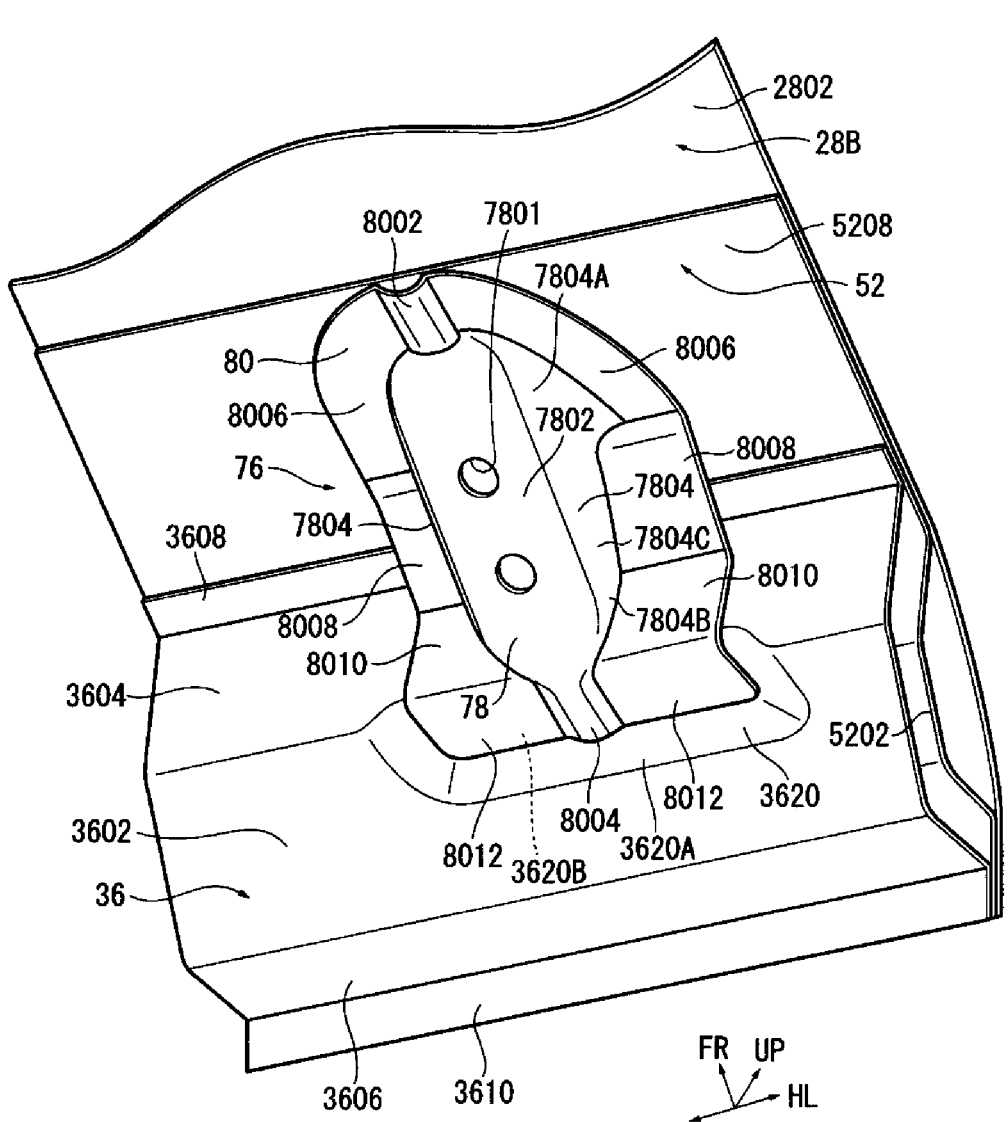
FIG. 6 is a perspective view showing a state in which a gusset is provided from a position of a rear floor cross member to a lower surface of a rear floor panel, as viewed from below.

As shown in FIGS. 2 and 6, a plurality of the gussets 76 are provided from a position of the rear floor cross member 36 sandwiched between the pair of rear mount portions 24B (the floor side rear brackets 40) to the position of the rear floor panel 28B located on the vehicle front side of the rear floor cross member 36. In the present embodiment, four gussets 76 are provided at an interval in the vehicle width direction.

As shown in FIGS. 2 to 5, the gusset 76 is provided from positions of the cross member lower surface portion 3602 and the cross member front surface portion 3604 of the rear floor cross member 36 to a position of the lower surface 2802 of the rear floor panel 28B located on the vehicle front side of the rear floor cross member 36.

Specifically, the gusset 76 extends in the vehicle front-rear direction between the pair of rear mount portions 24B below the rear floor panel 28B. One end portion of the gusset 76 is joined to the lower surface 2802 of the rear floor panel 28B. The other end portion of the gusset 76 is joined to a lower surface (the cross member lower surface portion 3602) of the rear floor cross member 36. The gusset 76 linearly connects the lower surface 2802 of the rear floor panel 28B and the lower surface of the rear floor cross member 36.

Further, as shown in FIG. 5, the gusset 76 extends linearly from the lower surface (the cross member lower surface portion 3602) of the rear floor cross member 36 to the lower surface 2802 of the rear floor panel 28B in a forward and obliquely upward direction.

Figures 7A, 7B:
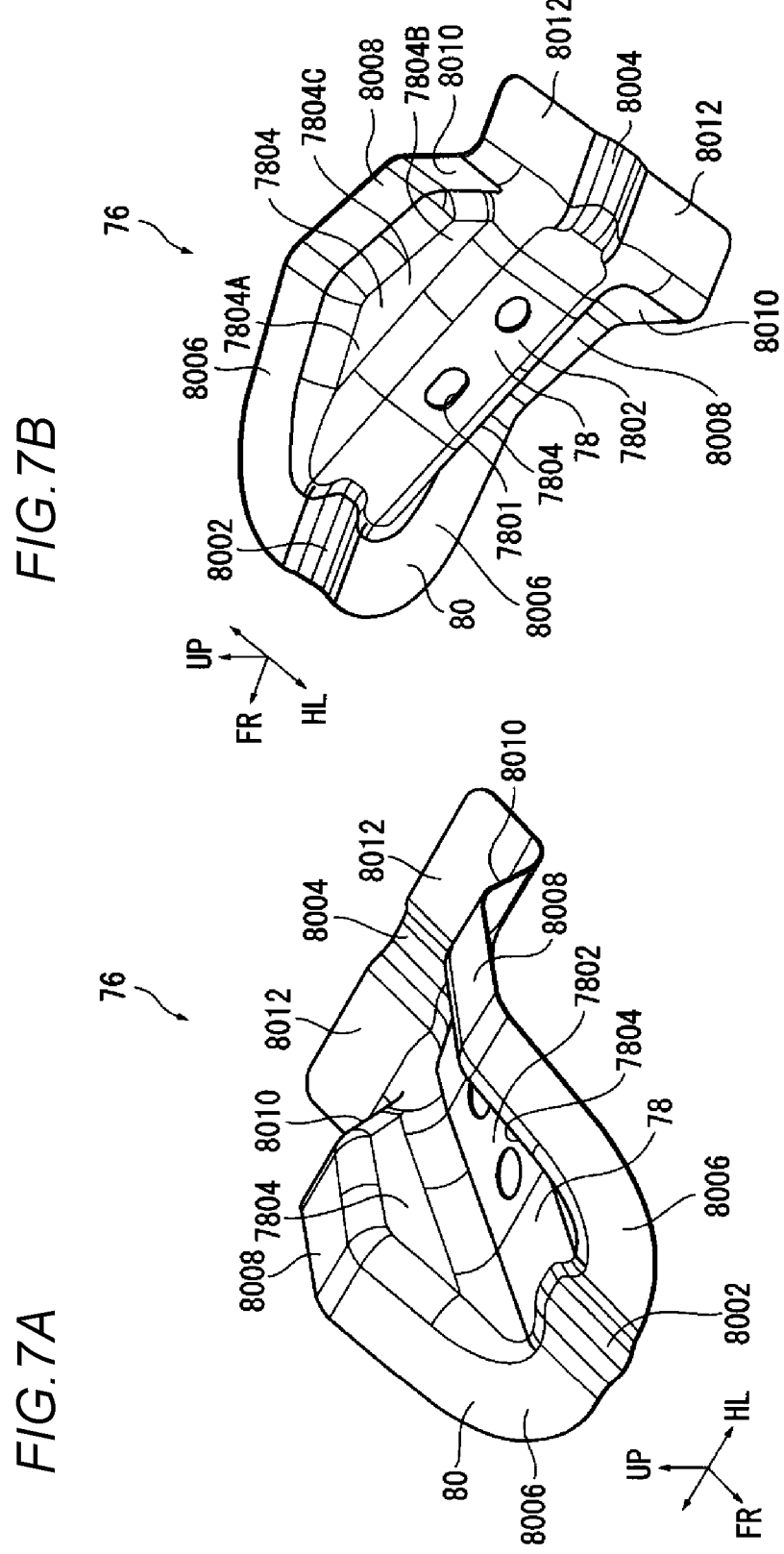
FIG. 7A is a perspective view of the gusset as viewed obliquely from above.
FIG. 7B is a perspective view of the gusset as viewed obliquely from below.

As shown in FIGS. 6, 7A, and 7B, the gusset 76 includes a central portion 78 extending linearly and a flange portion 80 provided around an entire periphery of the central portion 78.

The central portion 78 includes a bottom portion 7802 and a pair of side portions 7804.

The flange portion 80 extends from the bottom portion 7802 and end portions of the side portions 7804 along the cross member front surface portion 3604, which is a side surface of the rear floor cross member 36, and the lower surface 2802 of the rear floor panel 28B. The flange portion 80 includes a first flange 8002, a second flange 8004, third flanges 8006, fourth flanges 8008, fifth flanges 8010, and sixth flanges 8012.

As shown in FIGS. 3, 5, 6, 7A, and 7B, in a state in which the gusset 76 is attached to the cross member front surface portion 3604, the cross member lower surface portion 3602, and the lower surface 2802 of the rear floor panel 28B, the bottom portion 7802 extends obliquely in the vehicle front-rear direction, and the bottom portion 7802 has an inclination that is displaced downward from the vehicle front side toward the vehicle rear side.

In other words, the bottom portion 7802 has a predetermined width in the vehicle width direction, and extends linearly from the lower surface (the cross member lower surface portion 3602) of the rear floor cross member 36 to the lower surface 2802 of the rear floor panel 28B.

The first flange 8002 protrudes toward the vehicle front side from an edge of the bottom portion 7802 located on the vehicle front side. The second flange 8004 protrudes toward the vehicle rear side from an edge of the bottom portion 7802 located on the vehicle rear side. The first and second flanges 8002 and 8004 are formed by curved surfaces protruding downward.

As shown in FIGS. 6, 7A, and 7B, the pair of side portions 7804 stand upward from edges of the bottom portion 7802 on both sides which are located on both sides in the vehicle width direction.

In other words, each of the side portions 7804 extends from an end portion of the bottom portion 7802 toward a side surface of the rear floor cross member 36 on one end side in the vehicle width direction and the lower surface 2802 of the rear floor panel 28B.

Specifically, each of the side portions 7804 includes a front side surface 7804A that is provided at a position of the side portion 7804 on the vehicle front side and becomes higher as it goes toward the vehicle rear side, a rear side surface 7804B that is provided at a vehicle rear end of the side portion 7804 and becomes lower rapidly as it goes toward the vehicle rear side, and an intermediate side surface 7804C that connects the front side surface 7804A and the rear side surface 7804B.

Each of the third flanges 8006 protrudes outward in the vehicle width direction from an edge of the front side surface 7804A of each of the side portions 7804, and is connected to the first flange 8002.

Each of the fourth flanges 8008 protrudes outward in the vehicle width direction from an edge of the intermediate side surface 7804C of each of the side portions 7804, and is connected to the third flange 8006.

Each of the fifth flanges 8010 protrudes outward in the vehicle width direction from an edge of the rear side surface 7804B of each of the side portions 7804, and is connected to the fourth flange 8008.

Each of the sixth flanges 8012 protrudes toward the vehicle rear side from a lower end of each of the fifth flanges 8010, and is connected to the second flange 8004.

As shown in FIG. 3, a space S1 is formed between a curved surface of the first flange 8002 and the lower surface of the reinforcement front flange portion 5208, and when electrodeposition coating is performed in a state in which the rear floor panel 28B, the reinforcement 52, the rear floor cross member 36, and the gussets 76 are joined, a coating liquid is circulated inside the gussets 76 via the space S1.

As shown in FIG. 3, a space S2 is formed between a curved surface of the second flange 8004 and a lower surface of the cross member lower surface portion 3602, and when the electrodeposition coating is performed in the state in which the rear floor panel 28B, the reinforcement 52, the rear floor cross member 36, and the gussets 76 are joined, the coating liquid is circulated inside the gussets 76 via the space S2.

Figure 4:
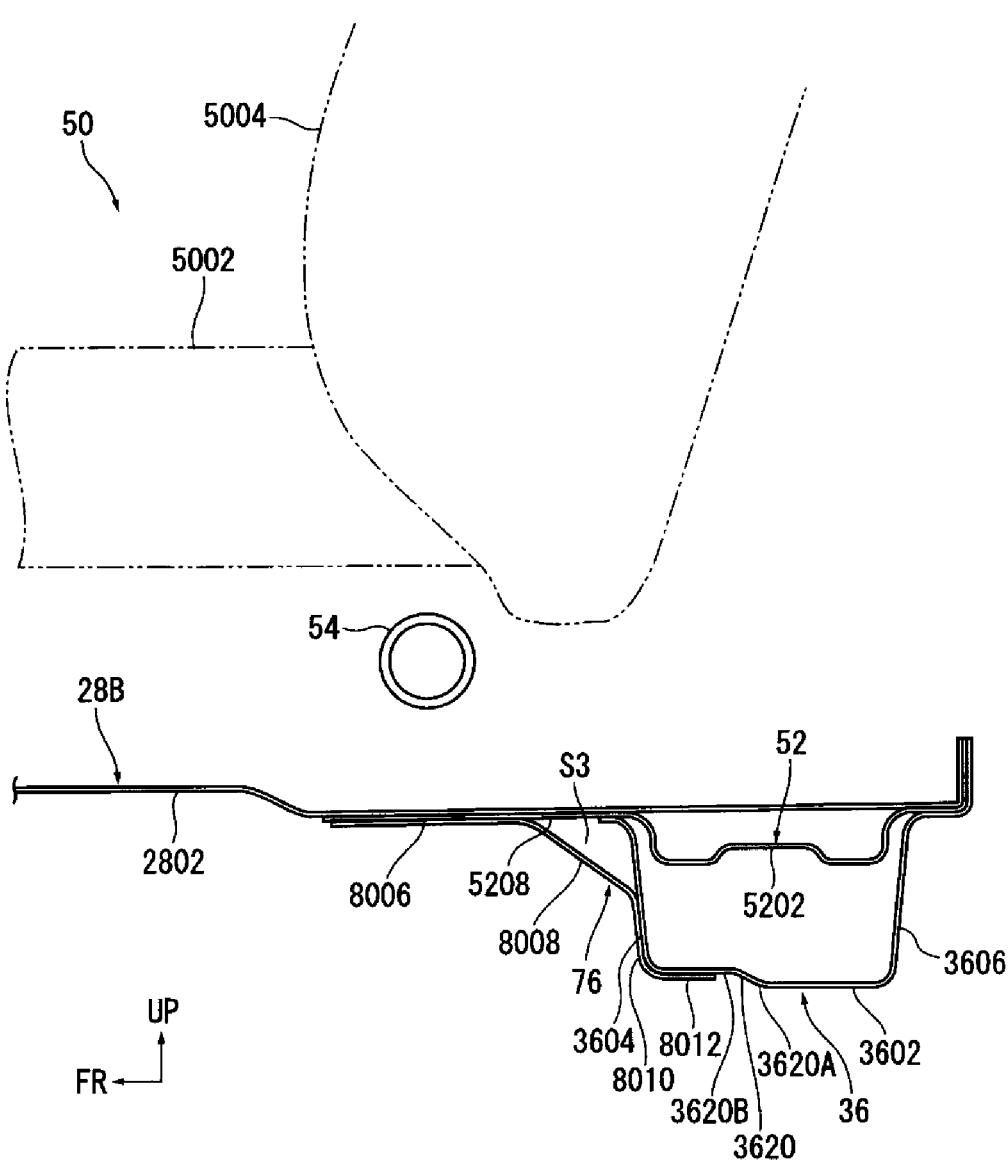
FIG. 4 is a cross-sectional view taken along a line B-B of FIG. 2.

As shown in FIG. 4, the third flange 8006 overlaps and is welded to the lower surface 2802 of the rear floor panel 28B via the reinforcement front flange portion 5208. Therefore, the third flange 8006, the first flange 8002, the reinforcement front flange portion 5208, and the rear floor panel 28B overlap with one another and are joined in a three-layer manner.

That is, a position of the gusset 76 on the vehicle front side overlaps from below a position on the vehicle front side of the reinforcement 52 overlapping the rear floor panel 28B, and is joined by welding together with the rear floor panel 28B and the reinforcement 52.

In other words, the one end portion of the gusset 76 overlaps from below one end portion in the vehicle front-rear direction of the reinforcement 52 overlapping the rear floor panel 28B, and is joined together with the rear floor panel 28B and the reinforcement 52.

As shown in FIG. 4, when viewed in the vehicle width direction, the fourth flange 8008 forms a triangular space S3 between the lower surface 2802 of the rear floor panel 28B and the cross member front surface portion 3604.

Therefore, when the electrodeposition coating is performed in the state in which the rear floor panel 28B, the reinforcement 52, the rear floor cross member 36, and the gussets 76 are joined, the coating liquid is circulated inside the gussets 76 via the space S3.

The fifth flange 8010 overlaps and is welded to a lower portion of the cross member front surface portion 3604, and therefore the fifth flange 8010 and the cross member front surface portion 3604 overlap each other and are joined in a two-layer manner.

The sixth flange 8012 overlaps and is welded to the cross member lower surface portion 3602, and therefore the sixth flange 8012 and the cross member lower surface portion 3602 overlap each other and are joined in a two-layer manner.

In FIGS. 3, 6, 7A, and 7B, a reference numeral 7801 denotes holes formed in the bottom portion 7802 of the central portion 78. The holes 7801 allow the coating liquid to flow through insides of the gussets 76 through the holes 7801 when the electrodeposition coating is performed in the same manner as described above.

As shown in FIGS. 4 and 6, in the present embodiment, on a position of the cross member lower surface portion 3602 to which the sixth flanges 8012 are welded, a recess 3620 that is recessed upward relative to another position of the cross member lower surface portion 3602 is formed. Surface rigidity of the cross member lower surface portion 3602 to which the sixth flanges 8012 are welded is increased by the recess 3620, and a joining strength between the gussets 76 and the rear floor cross member 36 is improved.

In other words, as shown in FIGS. 4 and 6, on one end portion of the lower surface of the rear floor cross member 36 in the vehicle front-rear direction, a step 3620A that extends in the vehicle width direction and a step surface 3620B that is a lower surface on one end side in the vehicle front-rear direction relative to the step 3620A and larger in height than a lower surface on the other end side in the vehicle front-rear direction relative to the step 3620A are formed.

Further, the sixth flanges 8012 (the other end portions) of the gusset 76 are joined to the step surface 3620B.

Next, functions and effects will be described.

According to the present embodiment, the gusset 76 is provided that extends between the pair of rear mount portions 24B below the rear floor panel 28B in the vehicle front-rear direction, includes one end portion joined to the lower surface 2802 of the rear floor panel 28B, includes the other end portion joined to the lower surface (the cross member lower surface portion 3602) of the rear floor cross member 36, and linearly connects the lower surface 2802 of the rear floor panel 28B and the lower surface of the rear floor cross member 36.

Therefore, a strength and rigidity of the rear floor cross member 36 can be increased by the gussets 76, which is advantageous in preventing torsional deformation of the rear floor cross member 36 even when a load due to vibration during traveling is input to the rear mount portions 24B on both sides.

Therefore, vibration and noise in the cabin can be prevented, and rigidity of the cab body 16 (the rear floor panel 28B) is improved by the gussets 76, which is advantageous in improving steering stability.

Further, in the present embodiment, on the one end portion of the lower surface of the rear floor cross member 36 in the vehicle front-rear direction, the step 3620A and the step surface 3620B that is a lower surface larger in height than the lower surface on the other end side in the vehicle front-rear direction relative to the step 3620A are formed. The sixth flanges 8012 (the other end portions) of the gusset 76 are joined to the step surface 3620B.

Therefore, by increasing the rigidity of the rear floor cross member 36 by the step 3620A and the step surface 3620B, it is more advantageous in preventing the torsional deformation of the rear floor cross member 36, and a shift of an attachment position of the gusset 76 with respect to the rear floor cross member 36 can be prevented by the step 3620A at a time of an attachment operation of the gusset 76, which is advantageous in improving workability.

Further, in the present embodiment, since the seat attachment portion 62 for attaching the rear seat 50 is provided at the position of the rear floor panel 28B which is located inside the contour of the gusset 76 in the plan view, a strength and rigidity of a position of the rear floor panel 28B at which the seat attachment portion 62 is provided are improved by the gusset 76, which is advantageous in preventing an amount of movement of the seat attachment portion 62 toward the vehicle front side at a time of a frontal collision of the vehicle 10 and which is advantageous in improving evaluation in a frontal collision test.

Further, in the present embodiment, since the anchor attachment portion 74 on which the buckle anchor 68 is attached is provided at the position of the rear floor panel 28B which is located inside the contour of the gusset 76 in the plan view, a strength and rigidity of a position of the rear floor panel 28B at which the anchor attachment portion 74 is provided are improved by the gusset 76, which is advantageous in preventing an amount of movement of the anchor attachment portion 74 toward the vehicle front side at the time of the frontal collision of the vehicle 10 and which is advantageous in improving the evaluation in the frontal collision test.

Further, in the present embodiment, the buckle 66 is disposed on a front side relative to the gusset 76 in the vehicle front-rear direction, and the gusset 76 extends linearly from the lower surface (the cross member lower surface portion 3602) of the rear floor cross member 36 to the lower surface 2802 of the rear floor panel 28B in the forward and obliquely upward direction.

Therefore, an extending direction of the gusset 76 and a load direction of the seat belt to which a burden is applied via the buckle 66 at a time of a collision coincide with each other, which is advantageous in preventing deformation of the gusset 76 due to the load burden.

Further, in the present embodiment, the reinforcement 52 extends in the vehicle front-rear direction while overlapping the rear floor panel 28B from the rear floor cross member 36. The one end portion of the gusset 76 overlaps from below the one end portion in the vehicle front-rear direction of the reinforcement 52 overlapping the rear floor panel 28B, and is joined together with the rear floor panel 28B and the reinforcement 52.

Therefore, connection between the gusset 76 and the rear floor cross member 36 is further reinforced by the reinforcement 52, which is advantageous in reinforcing peripheries of the gusset 76 and the rear floor cross member 36.

Further, in the present embodiment, the seat attachment portion 62 is provided at the position at which the reinforcement 52 and the rear floor panel 28B overlap each other on the one end portion side of the reinforcement 52 relative to the rear floor cross member 36 and on the rear floor cross member 36 side relative to the one end portion of the reinforcement 52.

Therefore, the strength and the rigidity of the position of the rear floor panel 28B on which the seat attachment portion 62 is attached are improved by the reinforcement 52, which is further advantageous in improving the evaluation in the frontal collision test.

Further, in the present embodiment, the anchor attachment portion 74 is provided at the position at which the reinforcement 52 and the rear floor panel 28B overlap each other on the one end portion side of the reinforcement 52 relative to the rear floor cross member 36 and on the rear floor cross member 36 side relative to the one end portion of the reinforcement 52.

Therefore, the strength and the rigidity of the position of the rear floor panel 28B at which the anchor attachment portion 74 is provided are improved by the reinforcement 52, which is advantageous in preventing the amount of movement of the anchor attachment portion 74 toward the vehicle front side at the time of the frontal collision of the vehicle 10 and which is advantageous in improving the evaluation in the frontal collision test.

Further, in the present embodiment, the gusset 76 includes the bottom portion 7802 having the predetermined width in the vehicle width direction and extending linearly from the lower surface (the cross member lower surface portion 3602) of the rear floor cross member 36 to the lower surface 2802 of the rear floor panel 28B, the side portions 7804 each extending from the end portion of the bottom portion 7802 toward the side surface of the rear floor cross member 36 on the one end side in the vehicle width direction and the lower surface 2802 of the rear floor panel 28B, and the flange portion 80 extending from the bottom portion 7802 and end portions of the side portions 7804 along the cross member front surface portion 3604, which is the side surface of the rear floor cross member 36, and the lower surface 2802 of the rear floor panel 28B.

Therefore, it is advantageous in improving rigidity around attachment portions of the rear floor panel 28B and the rear floor cross member 36 to which the gussets 76 are attached.

The present embodiment discloses a case where the one end portion of the gusset 76 is joined to the lower surface 2802 of the rear floor panel 28B in front of the rear floor cross member 36, However, the one end portion of the gusset 76 may be joined to the lower surface 2802 of the rear floor panel 28B at rear of the rear floor cross member 36, and the floor cross member to which the gusset 76 is joined may be a floor cross member other than the rear floor cross member 36.

Even in this case, there is no need to say that the same operations and effects as those according to the embodiment are exhibited.

The present application is based on Japanese patent application No. 2021-056634 filed on Mar. 30, 2021, and contents thereof are incorporated herein as reference.

REFERENCE SIGNS LIST

10 vehicle
12 chassis frame
14A front mount
14B rear mount
16 cab body
18 chassis side member
20 chassis cross member
24A front mount portion
24B rear mount portion
26 side sill
28 floor panel
28A front floor panel
28B rear floor panel
2802 lower surface
30 cabin main body
36 rear floor cross member
3602 cross member lower surface portion (lower surface)
3604 cross member front surface portion
3620A step
3620B step surface
50 rear seat
5002 seat cushion
5004 seat back
5006 seat cushion frame
5008 seat back frame
52 reinforcement
5208 reinforcement front flange portion
54 shaft
56 seat attachment member
58 stud bolt
60 nut
62 seat attachment portion
64 seat belt device 66 buckle
68 buckle anchor
70 plate nut
72 bolt
74 anchor attachment portion
76 gusset
78 central portion
7802 bottom portion
7804 side portion
7804A front side surface
7804B rear side surface
7804C intermediate side surface
80 flange portion
8002 first flange
8004 second flange
8006 third flange
8008 fourth flange
8010 fifth flange
8012 sixth flange

The invention claimed is:

1. A vehicle body structure of a cab-over type vehicle in which a cab body is supported by a chassis frame via mounts, the vehicle body structure of the cab-over type vehicle comprising:

a floor cross member extending in a vehicle width direction along a lower surface of a floor panel of the cab body and including a pair of mount portions on both sides in the vehicle width direction to which the mounts are attached; and a gusset extending in a vehicle front-rear direction between the pair of mount portions below the floor panel, including one end portion joined to the lower surface of the floor panel and the other end portion joined to a lower surface of the floor cross member, and linearly connecting the lower surface of the floor panel and the lower surface of the floor cross member, wherein on one end portion of the lower surface of the floor cross member in the vehicle front-rear direction, a step extending in the vehicle width direction and a step surface are formed, the step surface being a lower surface on one end side relative to the step in the vehicle front-rear direction and larger in height than a lower surface on the other end side in the vehicle front-rear direction relative to the step, and the other end portion of the gusset is joined to the step surface.

2. The vehicle body structure of the cab-over type vehicle according to claim 1, wherein the gusset includes:

a bottom portion having a predetermined width in the vehicle width direction and extending linearly from the lower surface of the floor cross member to the lower surface of the floor panel;

a side portion extending from an end portion of the bottom portion toward a side surface of the floor cross member on one end side in the vehicle width direction and the lower surface of the floor panel; and a flange portion extending from the bottom portion and an end portion of the side portion along the side surface of the floor cross member and the lower surface of the floor panel.

3. A vehicle body structure of a cab-over type vehicle in which a cab body is supported by a chassis frame via mounts, the vehicle body structure of the cab-over type vehicle comprising, a floor cross member extending in a vehicle width direction along a lower surface of a floor panel of the cab body and including a pair of mount portions on both sides in the vehicle width direction to which the mounts are attached; and a gusset extending in a vehicle front-rear direction between the pair of mount portions below the floor panel, including one end portion joined to the lower surface of the floor panel and the other end portion joined to a lower surface of the floor cross member, and linearly connecting the lower surface of the floor panel and the lower surface of the floor cross member, wherein a seat is disposed above the floor cross member, and a seat attachment portion configured to attach the seat is provided on a position of the floor panel located inside a contour of the gusset in a plan view.

4. The vehicle body structure of the cab-over type vehicle according to claim 3, further comprising:

a seat belt device including a seat belt configured to restrain an occupant seated on the seat and a buckle including a buckle anchor, a tongue of the seat belt to be inserted into and removed from the buckle, wherein an anchor attachment portion configured to attach the buckle anchor is provided on the position of the floor panel located inside the contour of the gusset in the plan view.

5. The vehicle body structure of the cab-over type vehicle according to claim 4, wherein the buckle is disposed on a front side relative to the gusset in the vehicle front-rear direction, and the gusset extends linearly from the lower surface of the floor cross member to the lower surface of the floor panel in a forward and obliquely upward direction.

6. The vehicle body structure of the cab-over type vehicle according to claim 4, further comprising:

a reinforcement provided between the floor cross member and the floor panel, wherein the reinforcement extends in the vehicle front-rear direction while overlapping the floor panel from the floor cross member, the one end portion of the gusset overlaps from below one end portion in the vehicle front-rear direction of the reinforcement overlapping the floor panel, and is joined together with the floor panel and the reinforcement, and the seat attachment portion and/or the anchor attachment portion is provided at a position at which the reinforcement and the floor panel overlap each other on a one end portion side of the reinforcement relative to the floor cross member and on a floor cross member side relative to the one end portion of the reinforcement.

7. A vehicle body structure of a cab-over type vehicle in which a cab body is supported by a chassis frame via mounts, the vehicle body structure of the cab-over type vehicle comprising:

a floor cross member extending in a vehicle width direction along a lower surface of a floor panel of the cab body and including a pair of mount portions on both sides in the vehicle width direction to which the mounts are attached;

a gusset extending in a vehicle front-rear direction between the pair of mount portions below the floor panel, including one end portion joined to the lower surface of the floor panel and the other end portion joined to a lower surface of the floor cross member, and linearly connecting the lower surface of the floor panel and the lower surface of the floor cross member, and a reinforcement provided between the floor cross member and the floor panel, wherein the reinforcement extends in the vehicle front-rear direction while overlapping the floor panel from the floor cross member, and the one end portion of the gusset overlaps from below one end portion in the vehicle front-rear direction of the reinforcement overlapping the floor panel, and is joined together with the floor panel and the reinforcement.

* * * * *